US008615353B2

(12) United States Patent
Bellinger et al.

(10) Patent No.: US 8,615,353 B2
(45) Date of Patent: Dec. 24, 2013

(54) DRIVELINE SYSTEM IMPACT REVERBERATION REDUCTION

(75) Inventors: Steven M. Bellinger, Columbus, IN (US); Balaji Arumugam, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1041 days.

(21) Appl. No.: 12/592,166

(22) Filed: Nov. 20, 2009

(65) Prior Publication Data

US 2011/0125390 A1 May 26, 2011

(51) Int. Cl.
*G06F 19/00* (2011.01)
*G06G 7/70* (2006.01)

(52) U.S. Cl.
USPC ............ 701/104; 701/110; 701/111; 123/344

(58) Field of Classification Search
USPC .......... 701/103, 104, 105, 110, 111; 123/320, 123/324, 344
See application file for complete search history.

(56) References Cited

U.S. PATENT DOCUMENTS 4,819,598 A * 4/1989 Mueller ........................ 123/399
4,843,914 A 7/1989 Koike
5,479,898 A * 1/1996 Cullen et al. .................. 123/350
5,692,992 A 12/1997 Arvidsson et al.
5,853,306 A 12/1998 Worth et al.
6,659,911 B2 12/2003 Suzuki et al.
6,678,605 B2 * 1/2004 Kisaka et al. ................. 701/111
6,942,530 B1 9/2005 Hall et al.
7,052,341 B2 5/2006 Kaji et al.
7,214,164 B2 5/2007 Shomura et al.
7,937,211 B2 * 5/2011 Aso ............................... 701/110
2002/0043244 A1 * 4/2002 Wiedenhoft et al. ..... 123/406.23
2004/0049328 A1 * 3/2004 Lee ................................ 701/22
2005/0065691 A1 * 3/2005 Cho ............................... 701/54
2008/0254940 A1 10/2008 Stoffels et al.

* cited by examiner

*Primary Examiner* — Willis R Wolfe, Jr.
*Assistant Examiner* — Anthony L Bacon
(74) *Attorney, Agent, or Firm* — Krieg DeVault LLP

(57) ABSTRACT

A method for driveline impact reverberation reduction including operating an engine coupled to a transmission; regulating operation of the engine with a controller to adjust fueling of the engine which includes providing a signal to the controller representative of a requested engine torque; determining a first fueling rate as a function of the signal and a set of preselected operating instructions; adjusting a set of engine operating parameters according to the first fueling rate; determining a second fueling rate as a function of the first fueling rate; and adjusting a set of engine operating conditions according to the second fueling rate.

16 Claims, 5 Drawing Sheets

DRIVELINE SYSTEM IMPACT REVERBERATION REDUCTION

BACKGROUND

The present application generally relates to engine control techniques, and more particularly, but not exclusively, reduced driveline system impact reverberation of an internal combustion engine.

In certain internal combustion engine systems, it is desirable to minimize driveline system impact reverberation. Present approaches to engine control of driveline system impact reverberation suffer from a variety of drawbacks, limitations, disadvantages and problems including those respecting sluggish engine response and others. There is a need for the unique and inventive engine control apparatuses, systems and methods disclosed herein.

SUMMARY

One embodiment of the present application includes a unique engine control technique. Other embodiments include unique apparatus, systems, and methods to control an engine for reducing driveline system impact reverberation. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
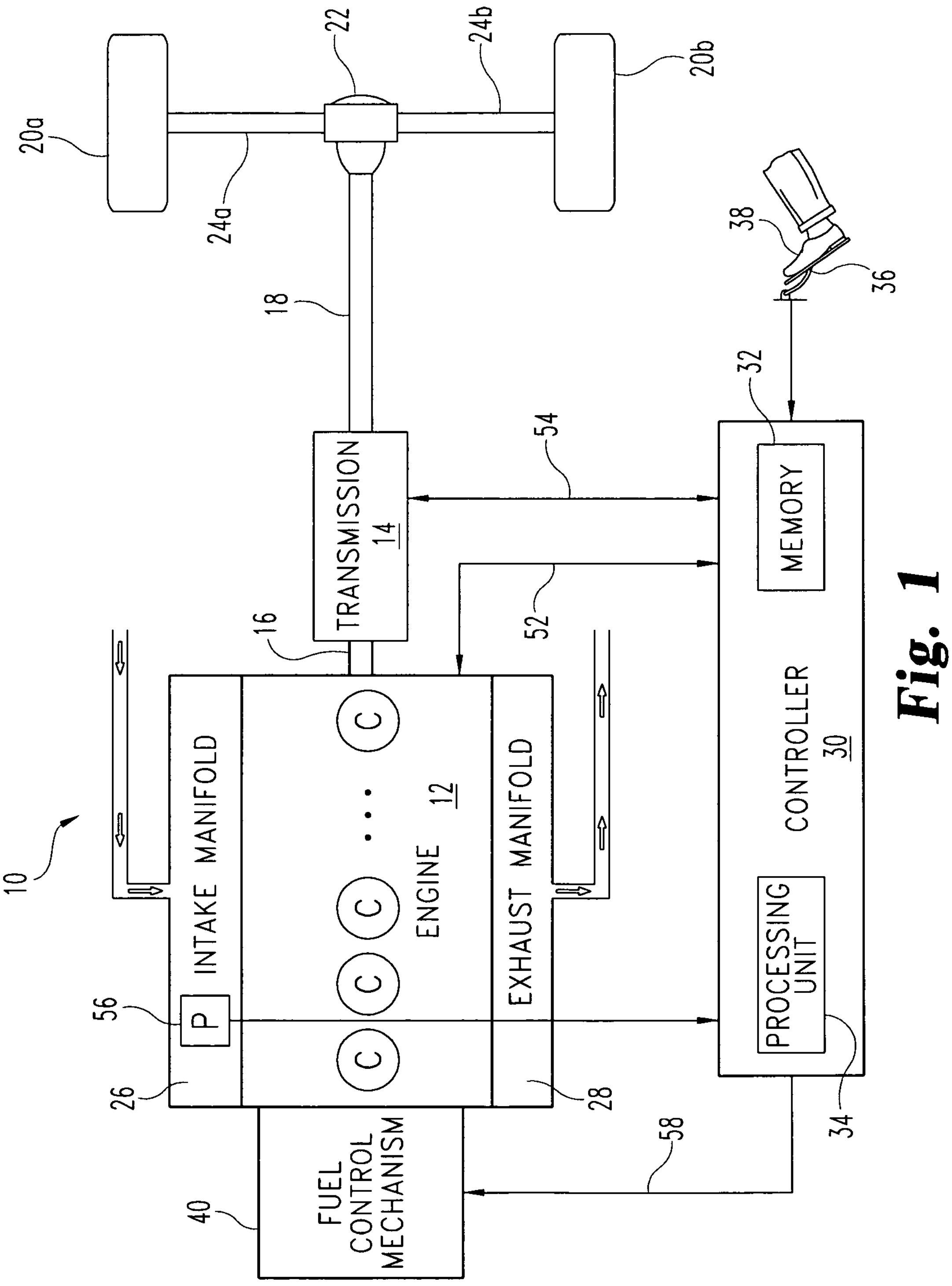
FIG. 1 is a schematic diagram of one embodiment of a system including an internal combustion engine system and a transmission.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments and any further applications of the principles of the invention as described herein are contemplated as would normally occur to one skilled in the art to which the invention relates.

One embodiment of the present application includes a technique for reducing driveline system impact reverberation. In certain driveline systems, it has been observed that abrupt torque reversals create high driveline impact forces. These impact forces result in undesirable tactile and audible noises, vibration and harshness but these undesirable results can be reduced by controlling the torque reversal. By way of non-limiting example, the torque reversal is controlled by extending the time over which the torque reversal takes place. This torque change control can be in the form of controlling a torque transition which can further be in the form of controlling a fueling rate. Alternatively or additionally, such a system control may include a technique for determining which of a preselected range of ramp rates apply and correspondingly adjusting the engine parameters in response to reduce driveline impact reverberation or driveline clunking.

FIG. 1 illustrates a powertrain system 10 of a further embodiment. Powertrain system 10 includes an internal combustion engine 12 and a transmission 14. Engine 12 is of the reciprocating piston type having one or more reciprocating pistons C journaled to a crankshaft 16. Crankshaft 16 is rigidly coupled to the transmission input. The transmission output is coupled to a pair of drive wheels 20*a*, 20*b* through a drive shaft 18, a differential gearset (DG) 22 and a set of half-shafts 24*a*, 24*b*. In another embodiment, the gearset may be part of the transmission. In one embodiment, system 10 may provide power to a front wheel drive vehicle with the engine and transmission configured transversely.

In other embodiments of the present application not shown in FIG. 1, engine 12 may engage drive wheels 20*a*, 20*b* through a gearbox, clutch, torque converter, or other mechanical linkage as would occur to one skilled in the art. For an alternative embodiment, system 10 may include a torque converter positioned between engine 12 and transmission 14. The torque converter may be coupled to engine 12 via crankshaft 16 and may be coupled to transmission 14 via a turbine shaft. The torque converter may include a clutch capable of being engaged. Torque converter input and output speeds may be used to determine a condition of transmission 14. In other embodiments, the transmission may include an electronically controlled transmission with several gear ratios and various other gears that are selectable.

In one form, engine 12 is of the four stroke diesel-fueled type with compression ignition and fuel injection. In other embodiments, engine 12 can be of a spark-ignited type, the two-stroke type, a rotary type such as a gas turbine engine, and/or may not utilize any form of fuel injection, to name just a few alternative possibilities. Furthermore, other embodiments may be differently fueled, such as by gasoline, ethanol, hydrogen, natural gas, propane, other gaseous fuels, and/or a hybrid combination of fuel types—just to mention some possibilities. It is also contemplated that system 10 may, in addition to being used to provide power to mobile applications such as vehicles, provide power to stationary applications, such as electrical power generators, pumps, and the like. In addition, system 10 may be used in hybrid applications that include one or more power sources in addition to engine 12, such as batteries, fuel cells—to name a few.

Engine 12 includes an exhaust manifold 28 and an intake manifold 26 with a manifold air pressure (MAP) sensor 56. In response to input from an operator 38 through a throttle position pedal 36, fuel is supplied to engine 12 by a conventional fuel control mechanism 40. Fuel control mechanism 40 is regulated by a controller 30 via line 58. Controller 30 is operatively connected to fuel control mechanism 40 to modulate engine fueling and regulate related processes. Controller 30 utilizes pre-defined algorithms and look up tables based on various inputs and in response to certain engine operating conditions to determine a control mode for fuel control mechanism 40.

Figure 2:
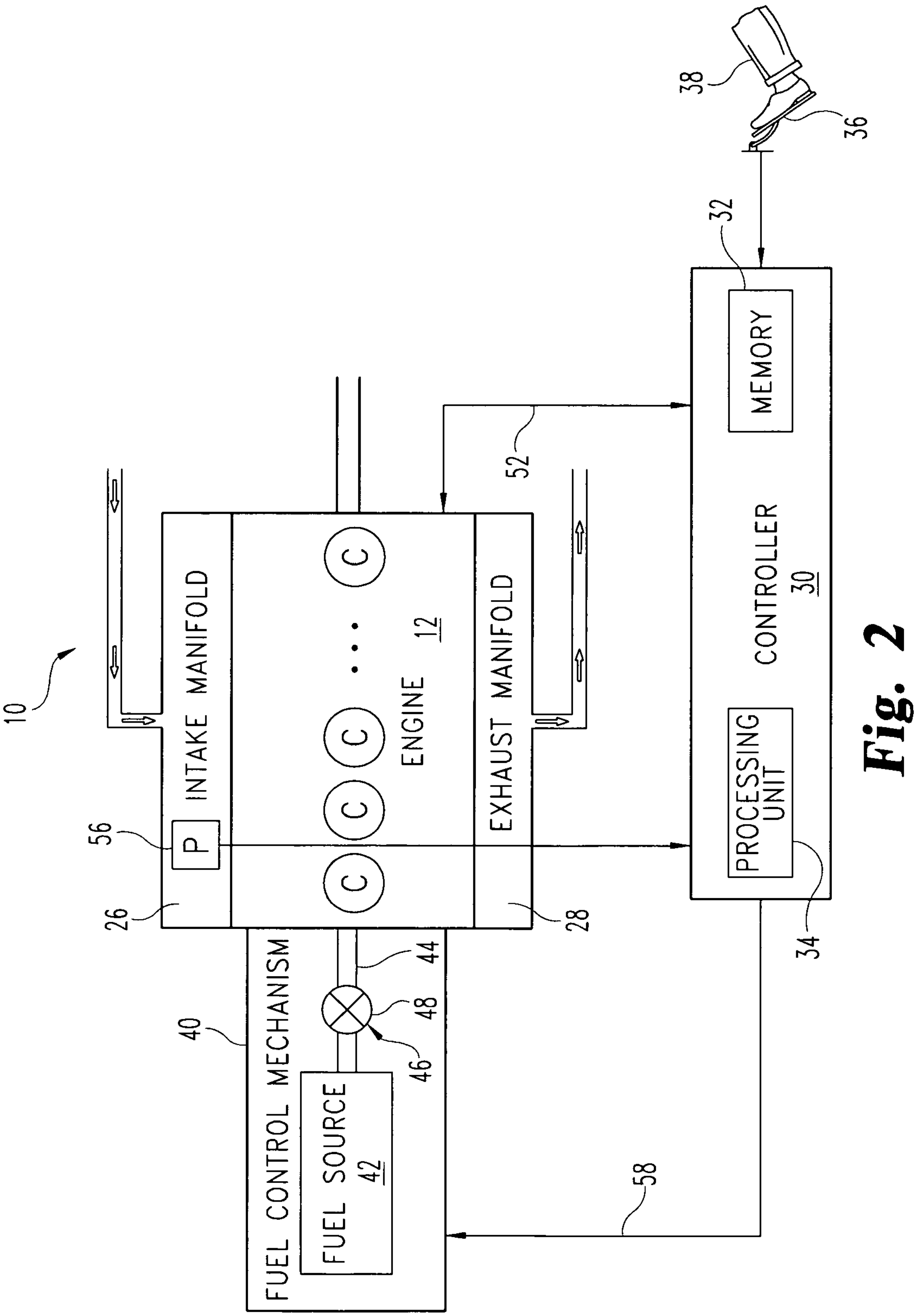
FIG. 2 is a schematic diagram of one embodiment of an internal combustion engine system with a fuel control mechanism.

For one embodiment, as shown in FIG. 2, fuel control mechanism 40 supplies fuel to engine 12 from a fuel source 42 through a fuel input 44. Fuel input 44 may be mounted in the side of the combustion chamber (not shown) or on top of the combustion chamber for direct injection. Fuel input 44 may also be located in the air intake system (not shown) for port injection. A fuel device 46 is located between fuel source 42 and fuel input 44. In the embodiment shown in FIG. 2, fuel device 46 includes a controllable fuel valve 48 that regulates the flow of fuel from fuel source 42 to fuel input 44 of engine 12. Controllable fuel valve 48 modulates fuel flow in accordance with a control signal from controller 30. Fuel may be provided through one or more injection techniques and/or through carburetion to name just a few possibilities. The fuel may be of any type, including but not limited to gasoline, a gaseous fuel (a fuel that is in gas phase at standard temperature and pressure such as natural gas), diesel fuel, ethanol, or a hybrid combination of fuel types.

Typically, controller 30 is included in a standard type of Engine Control Module (ECM), including one or more types of memory 32. Controller 30 can be an electronic circuit comprised of one or more components, including digital circuitry, analog circuitry, or both. Controller 30 may be a software and/or firmware programmable type; a hardwired, dedicated state machine; or a combination of these.

In one embodiment, controller 30 is a programmable microcontroller solid-state integrated circuit that integrally includes one or more processing units 34 and memory 32. Memory 32 can be comprised of one or more components and can be of any volatile or nonvolatile type, including the solid state variety, the optical media variety, the magnetic variety, a combination of these, or such different arrangement as would occur to those skilled in the art. Further, while only one processing unit 34 is specifically shown, more than one such unit can be included. When multiple processing units 34 are present, controller 30 can be arranged to distribute processing among such units, and/or to provide for parallel or pipelined processing if desired. Controller 30 functions in accordance with operating logic defined by programming, hardware, or a combination of these.

In one form, memory 32 stores programming instructions executed by processing unit 34 of controller 30 to embody at least a portion of this operating logic. Alternatively or additionally, memory 32 stores data that is manipulated by the operating logic of controller 30. Controller 30 can include signal conditioners, signal format converters (such as analog-to-digital and digital-to-analog converters), limiters, clamps, filters, and the like as needed to perform various control and regulation operations described in the present application. Controller 30 receives various inputs and generates various outputs to perform various operations as described hereinafter in accordance with its operating logic.

Referring back to FIG. 1, controller 30 is connected to and communicates with various devices of engine 12 through a set of engine control signal pathways 52. Additionally, controller 30 communicates with transmission 14 via line 54. Controller 30 may also control shifting of transmission 14. In the alternative, a separate controller may exist for transmission shifting or the transmission may be of manual type without a controller. In a further variation in which the transmission is operator-controlled or a manual transmission shifting system, there may be communication between controller 30 and components of transmission 14 via line 54 in the direction to transmit status of transmission 14 to controller 30. Controller connections may be implemented with a dedicated, direct line through an electrical or optical cable, a wireless communication connection, and/or through any compatible bus, network, communication interface, or the like. In one particular form, a CAN (Controller Area Network) bus is utilized.

As will be explained below, controller 30 operates in response to a number of inputs, including, but not limited to, engine speed, throttle pedal position, driver torque request, engine control state, clutch switch input, out-of-gear status, vehicle speed, transmission type, and/or torque converter duty cycle.

Torque produced by an engine can change rapidly in response to certain operator input such as acceleration (Tip-In) and deceleration (Tip-Out). Rapid changes in torque occurring with an abrupt torque reversal result in high driveline impact forces. These impact forces, which are amplified in drivelines containing high levels of included lash result in tactile and audible noise, vibration and harshness. All vehicle drivelines contain lash, since it is inherent to the use of gear meshes, splines, slip yoke, dampers etc. One embodiment of the present application includes a technique for minimizing driveline impact reverberation by controlling torque changes during both Tip-In and Tip-Out events without the use of additional mechanical or electrical components.

In one embodiment, controller 30 receives input from engine 12 via line 52 of engine operating parameters. Controller 30 operates to determine a detected engine torque as a function of inputs of the engine operating parameters. A detected engine torque could represent the current operating parameters of engine 12. In another embodiment, controller 30 operates to detect operating parameters of transmission 14 as a function of the inputs from transmission 14 via line 54. Transmission inputs may include gear selection, gear selection position, clutch switch status, clutch engagement status and out-of-gear status. Controller 30 may be preprogrammed with data such as transmission type and related gear mechanism configurations. The preprogrammed data and the transmission inputs may be factors in determinations made by controller 30 regarding a transmission status such as whether the driveline is engaged or disengaged. In at least some operator-controlled or manual transmission embodiments, controller 30 may not communicate with the transmission. In still other embodiments, the transmission may be controlled by a device separate and independent of controller 30.

One embodiment includes controller 30 receiving a requested engine torque. Operator 38 transfers a selection of torque requirements to engine 12 by providing controller 30 with input from throttle pedal position 36. Operator 38 is capable of signaling an acceleration request or Tip-In event. Operator 38 is also capable of signaling a deceleration or Tip-Out event.

Upon completion of receiving and processing inputs for determining a requested engine torque, controller 30 detects a set of engine operating parameter conditionals such as transmission status, gear status, engine speed and/or vehicle speed. If the engine operating parameter conditionals are met, controller 30 would determine a torque value from detected engine torque and requested engine torque. If the torque value is determined to be within a range of torque change which creates high driveline impact forces, controller 30 can provide a torque change control output. In one embodiment, the torque change control output may represent a fueling rate sent to fuel system 40 via line 58 which modifies the torque transition as the torque moves through torque reversal. The modified torque transition is extended to adjust for a longer period of time for the torque reversal to take place. Torque transition can be calculated from the change in torque over the change in time.

To keep the modified torque transition from being perceived by operator 38 as a sluggish performance during acceleration or Tip-In situations or a noticeable lack of deceleration or run-on for Tip-Out situations, multiple torque transition can be applied to engine 12 as the torque moves through torque thresholds. In one embodiment through the application of engine fueling and torque management software algorithms, engine fueling and torque is controlled to extend the time over which a driveline torque reversal occurs while also limiting torque transmitted during the driveline torque reversal. During a change in torque, engine fueling and torque controls use multiple software definable threshold values to accomplish different fueling rates. By incorporating engine fueling and torque data with throttle position information in the operations of controller 30, engine fueling and torque are controlled during driveline torque reversals while having no discernible impact on engine operation or performance.

Figure 3:
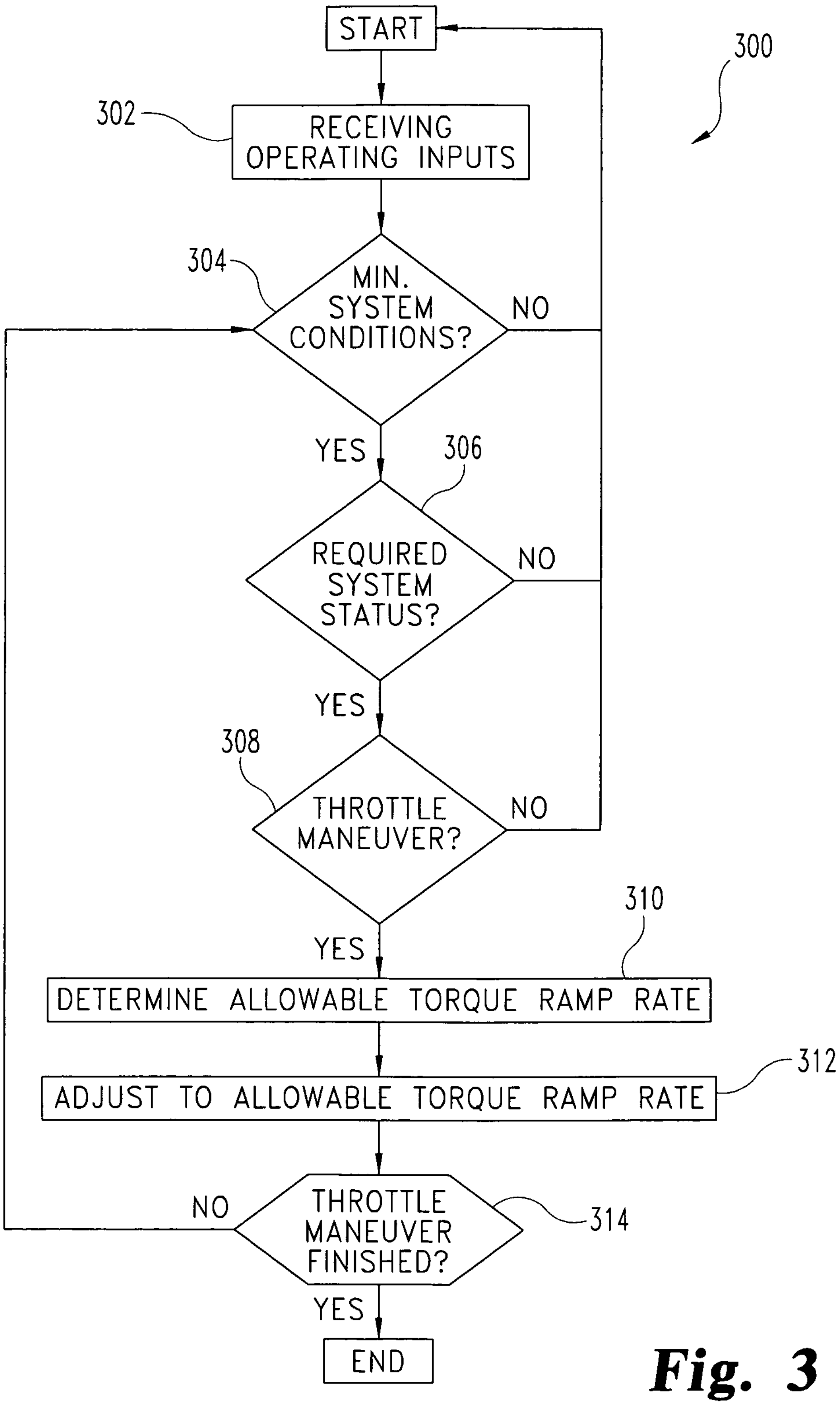
FIG. 3 is a flow diagram of a procedure that can be performed with the system of FIG. 1.

One embodiment of the present application is illustrated in FIG. 3 with Procedure 300. Procedure 300 is initiated with the collection of inputs from various components of the engine system in Operation 302. Various inputs include, but are not limited to, engine speed, throttle pedal position, driver torque request, engine control state, clutch switch input, out-of-gear status, vehicle speed, transmission type, and torque converter duty cycle. These inputs are used in the processes and conditions remaining in Procedure 300.

Following Operation 302, Conditional 304 detects whether or not a set of minimum system conditions are meet. In one variation, the minimum conditions would include a minimum engine speed, a WOT condition, and a minimum vehicle speed. A negative response to Conditional 304 sends Procedure 300 to the Start again to receive operating inputs. A positive response to Conditional 304 leads to Conditional 306 to detect a required system status. One variation would include detecting whether the system is in-gear or out-of-gear. A negative response to Conditional 306 returns Procedure 300 to the Start. A positive response to Conditional 306 leads to Conditional 308.

Conditional 308 detects whether or not a torque change or throttle maneuver has been requested. In one variation, a throttle maneuver can be considered a Tip-In or Tip-Out event based upon throttle pedal position and driver demanded torque. A negative response to Conditional 308 returns Procedure 300 to the Start. A positive response to Conditional 308 leads to Operation 310 which determines an allowable torque transition. The allowable torque transition is based on various factors. These factors include, but are not limited to, a tip-in event, a tip-out event, system load, torque converter duty cycle, vehicle speed, and throttle pedal position.

Once an allowable torque transition has been determined, Procedure 300 moves to Operation 312 which adjusts engine operating parameters according to the determined allowable torque transition. Procedure 300 continues with Conditional 314. Conditional 314 detects whether, following the application of the determined allowable torque transition, the system has completed the throttle maneuver. In certain variations, completion of the maneuver may be indicated by the engine torque being outside a set of pre-defined zones. A negative response to Conditional 314 returns Procedure 300 to Conditional 304 while a positive response to Conditional 314 ends Procedure 300. Procedure 300 then returns to the Start.

Figure 4:
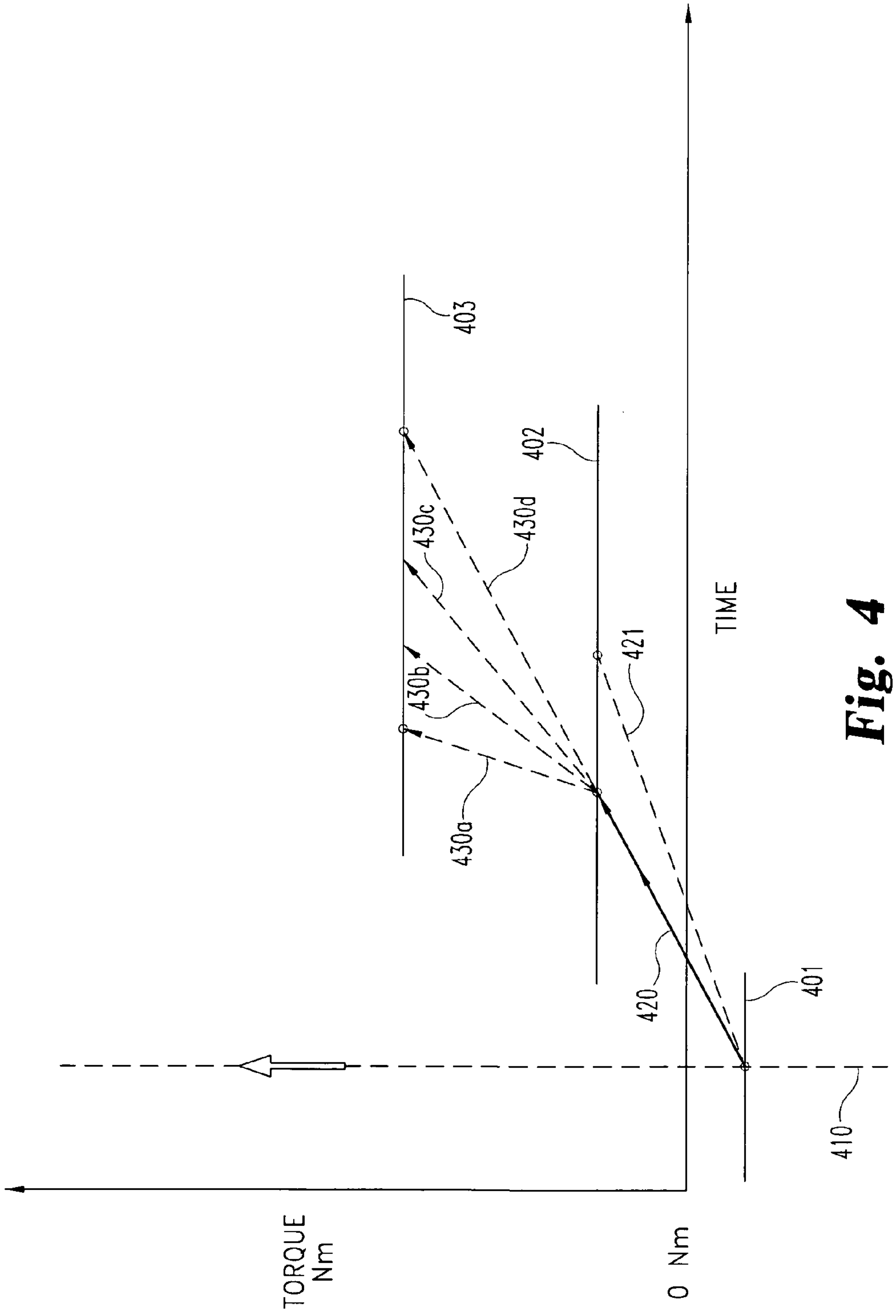
FIG. 4 is a graph showing torque changes over time according to the procedure of FIG. 3 during an exemplary tip-in engine event.
Figure 5:
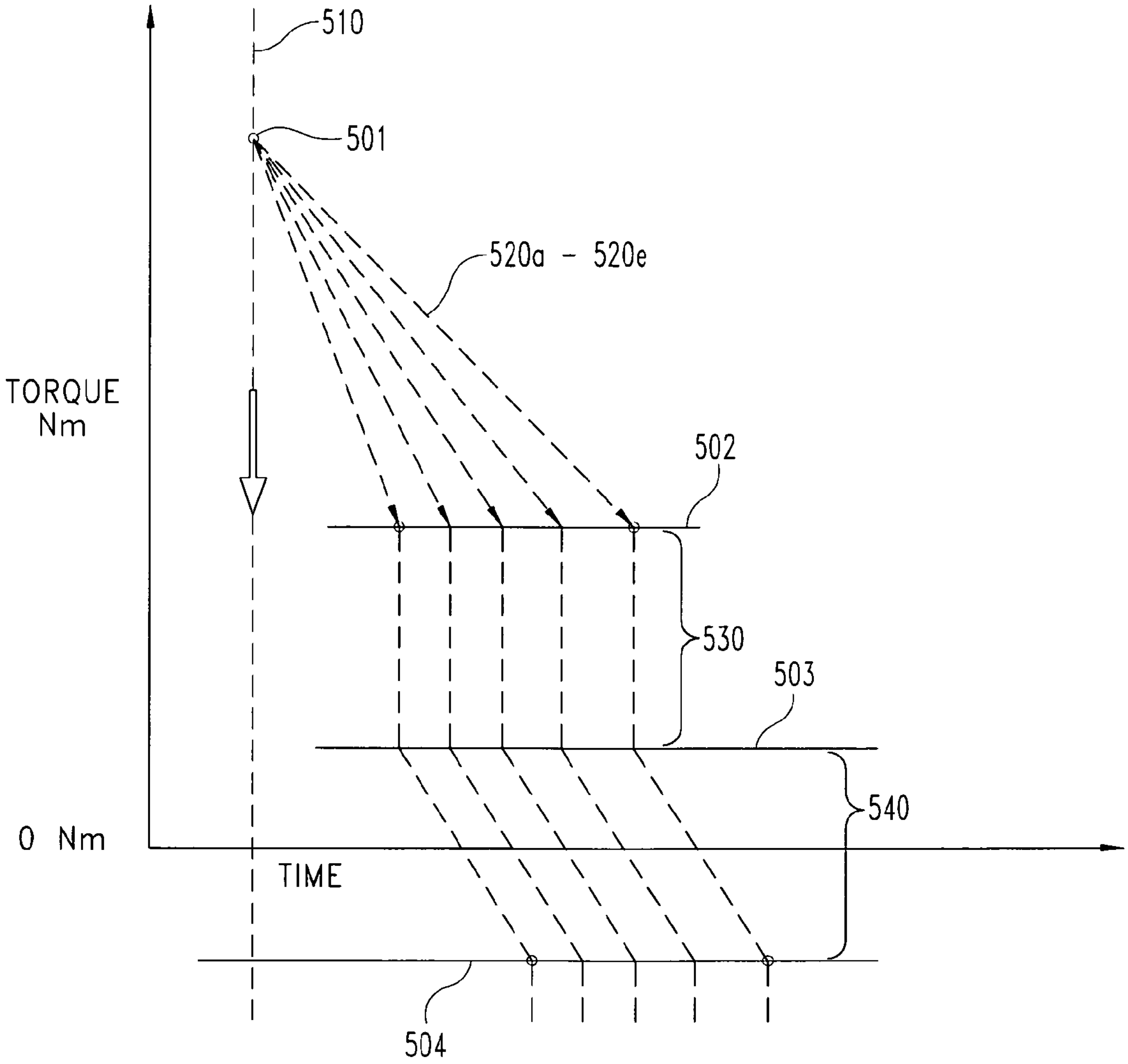
FIG. 5 is a graph showing torque changes over time according to the procedure of FIG. 3 during an exemplary tip-out engine event.

FIGS. 4 and 5 are illustrations of a set of response curves for a plurality of controlled torque outputs corresponding to a plurality of torque request inputs. The graphs in FIGS. 4 and 5 are example data for illustrative purposes and do not necessarily represent a real system. FIG. 4 illustrates an engine response to one embodiment of the present application following a tip-in or sudden acceleration event. The graph in FIG. 4 shows the control of torque over time in response to a torque request. Based on engine operating parameters, the slope of the torque over time line is modified to an allowable torque transition. This allowable torque transition is adjusted as the torque moves through the torque reversal point and then increases to meet the requested torque.

In this embodiment, curve 410 represents the change in torque over time of an uncontrolled tip-in or acceleration event. Positive thresholds 401, 402, and 403 indicate a torque output region requiring varying response from an engine operating system. The thresholds are states of torque change from preselected operating instructions. For this embodiment, a first allowable transition is shown as curve 420 and is determined as a function of engine operating parameters. Curve 420 represents the controlled torque response between first positive threshold 401 through the torque reversal region to second positive threshold 402. In another embodiment, curve 421 represents the same transition as 420 but adjusts for engine conditions such as the torque converter not being engaged and the vehicle speed being below a set threshold. A second allowable torque transition is then followed based on the first allowable torque transition and the degree of torque request and is shown in curve 430*a* through 430*d*. Curves 430*a* through 430*d* represent the torque change over time between second positive threshold 402 and third positive threshold 403. Curve 430*a* represents a condition when a heavy throttle operation is requested and curve 430*d* represents a condition where a light throttle operation is requested. Curves 430*b* and 430*c* represent decreasing degrees of throttle operation between heavy at 430*a* and light at 430*b*. Above third positive threshold 403, the allowable torque transition approaches the requested torque or throttle response and the torque transition curve follows the uncontrolled change in torque rate shown in curve 410.

In one embodiment, a response to a torque change is determined from various inputs of system 10 and a torque transition is modified to a controlled value. For example, a torque response begins by responding in a manner similar to curve 410. Upon reaching first positive threshold 401, the torque transition is modified to follow curve 420 through the negative to positive torque reversal. The torque transition is again modified after reaching second positive threshold 402 to follow curve 430*a*. In this embodiment, the last modification to torque transition occurs once the torque reaches third positive threshold 403. The torque transition is then allowed to follow the uncontrolled response shown in curve 410 until the torque request is met. In other embodiments, the number of thresholds may vary to include a large number of positive thresholds and torque transition modifications.

FIG. 5 illustrates a similar engine response following a tip-out or sudden deceleration event. Curve 510 represents the change in torque over time of an uncontrolled tip-out or deceleration event. Negative threshold values 501, 502, 503, and 504 indicate a torque output region requiring varying responses from the engine operation system. In other embodiments, the number of thresholds may vary to include a large number of negative thresholds and torque transition modifications. Curves 520*a* through 520*e* represent a set of controlled torque responses between first negative threshold 501 and second negative threshold 502. In this embodiment, curve 520*a* represents a low vehicle speed condition and curve 520*e* represents a high vehicle speed condition. In other embodiments, the number of discrete curves between the extreme of high and low vehicle speed can vary beyond the five curves shown here.

In region 530 between second negative threshold 502 and third negative threshold 503, torque transition is allowed to follow curve 510. Upon approaching the positive to negative torque transition, third negative threshold 503 signals a modified torque transition shown in region 540. In one embodiment, the modified transitions are based on engine models:

normal v. thermal regeneration. Below negative threshold 504, each curve follows the uncontrolled change in torque to complete the response to the torque request.

One embodiment of the present application is a system including an internal combustion engine; a set of sensors operable to generate a control signal representative of a requested engine torque; a controller responsive to the control signal to determine a torque transition; the controller being operable to generate an output signal as a function of the torque transition. One variation of this embodiment would further include a fueling device responsive to the output signal to provide fuel to the engine.

Another embodiment of the present application is a system including an internal combustion engine; a set of sensors operable to generate a control signal representative of a requested engine torque; a controller responsive to the control signal to determine a first torque transition; the controller being operable to generate a first output signal as a function of the first torque transition; and a fueling device responsive to the first output signal to provide fuel to the engine. The controller is further responsive to the control signal and the first torque transition to determine a second torque transition and operable to generate a second output signal as a function of the second torque transition and wherein the fueling device is further responsive to the second output signal to provide fuel to the engine. One variation of this embodiment would further include a third torque transition and a third output signal.

In yet another embodiment is a method which includes operating an engine coupled to a transmission; regulating operation of the engine with a controller to adjust fueling of the engine. Regulating the engine includes providing a signal to the controller representative of a requested engine torque; determining a first fueling rate as a function of the signal and a set of preselected operating instructions; adjusting a set of engine operating parameters according to the first fueling rate; determining a second fueling rate as a function of the first fueling rate and a set of preselected operating instructions; and adjusting a set of engine operating parameters according to the second fueling rate.

One other embodiment of the present application is a method including providing an internal combustion engine with a controller; providing a set of engine operating inputs; detecting a set of minimum engine conditions; detecting a transmission status; in response to the minimum engine conditions and the transmission status, determining a torque change request based on the set of engine operating inputs; detecting a first state of torque change based on a set of preselected operating instructions; in response to the torque change request and the first state of torque change, determining a first torque transition; detecting a second state of torque change based on a set of preselected operating instructions; in response to the first torque transition and the second state of torque change, determining a second torque transition; and providing a second torque change response based on the second torque transition.

The method of this embodiment further includes detecting a third state of torque change based on a set of preselected operating instructions; in response to the second torque transition and the third state of torque change, determining a third torque transition; and providing a third torque change response based on the third torque transition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:

operating an engine coupled to a transmission;

regulating operation of the engine with a controller to adjust fueling of the engine which includes:

providing a signal to the controller representative of a requested engine torque, wherein the requested engine torque requires a torque reversal from a detected engine torque;

determining a first fueling rate as a function of the signal and a set of preselected operating instructions, wherein the first fueling rate corresponds to a first allowable torque transition rate from the detected engine torque through the torque reversal;

adjusting a set of engine operating parameters according to the first fueling rate;

determining a second fueling rate as a function of the first fueling rate and the set of preselected operating instructions, wherein after the torque reversal the second fueling rate adjusts the first allowable torque transition rate to a second allowable torque transition rate that is greater than the first allowable torque transition rate; and adjusting a set of engine operating parameters according to the second fueling rate.

2. The method of claim 1, wherein the set of engine operating parameters further includes transitioning from the detected engine torque to the requested engine torque.

3. The method of claim 1, wherein the first allowable torque transition rate limits a quantity of torque transmitted to a driveline during the torque reversal.

4. The method of claim 1, wherein adjusting the set of engine operating parameters further includes controlling a time over which the torque reversal occurs.

5. The method of claim 1, wherein the torque reversal occurs in response to a tip-in event.

6. The method of claim 1, wherein the torque reversal occurs in response to a tip-out event.

7. The method of claim 1 further including determining a third fueling rate as a function of the second fueling rate and a set of preselected operating instructions, wherein the third fueling rate corresponds to a third allowable torque transition rate that differs from the first and second allowable torque transition rates, and adjusting the set of engine operating parameters according to the third fueling rate.

8. The method of claim 1 wherein the signal representative of the requested engine torque is provided by an in-gear throttle maneuver.

9. The method of claim 8 wherein the in-gear throttle maneuver is a tip-in acceleration event.

10. The method of claim 8 wherein the in-gear throttle maneuver is a tip-out deceleration event.

11. A method comprising:

providing an internal combustion engine with a controller;

providing a set of engine operating inputs;

detecting a set of minimum engine conditions;

detecting a transmission status;

in response to the minimum engine conditions and the transmission status, determining a torque change request based on the set of engine operating inputs, wherein the torque change request includes a torque reversal;

detecting the torque reversal of the torque change request based on a set of preselected operating instructions;

in response to the torque change request and the torque reversal, determining a first torque transition;

providing a first torque change response based on the first torque transition;

detecting a completion of the torque reversal of the torque change request based on the set of preselected operating instructions;

in response to the completion of the torque reversal, determining a second torque transition; and providing a second torque change response based on the second torque transition, wherein the first and second torque change responses satisfy the torque change request.

12. The method of claim 11 wherein the first torque change response includes adjusting a fuel injection timing value and a fuel injection quantity.

13. The method of claim 11 which further includes:

detecting a completion of the second torque transition based on the set of preselected operating instructions;

in response to the completion of the second torque transition, determining a third torque transition; and providing a third torque change response based on the third torque transition, wherein the first, second and third torque change responses satisfy the torque change request.

14. The method of claim 11, wherein the first torque change corresponds to a first torque transition rate and the second torque change corresponds to a second torque transition rate that is greater than the first torque transition rate.

15. The method of claim 11, wherein the torque reversal occurs in response to a tip-in event.

16. The method of claim 11, wherein the torque reversal occurs in response to a tip-out event.

* * * * *